United States Patent [19]
Wesener, deceased

[11] 3,823,673
[45] July 16, 1974

[54] CONVEYOR INSTALLATION WITH INDIVIDUAL RAIL-BOUND SELF-PROPELLING VEHICLES OR VEHICLE GROUPS

[75] Inventor: Erich Wesener, deceased, late of Munchen-Obermeinzing, Germany by Renate Wesener and Oliver Wesener, heirs

[73] Assignee: Buro Patent AG, Glarus, Switzerland

[22] Filed: Aug. 11, 1972

[21] Appl. No.: 280,077

[30] Foreign Application Priority Data
Aug. 13, 1971 Switzerland.................... 11919/71

[52] U.S. Cl................. 104/148 R, 105/61, 180/96, 200/61.44, 293/4
[51] Int. Cl............................................. B60l 3/04
[58] Field of Search..... 104/148 R, 172 BT; 180/96; 318/447; 293/4; 105/61; 200/61.44, DIG. 10; 214/44

[56] References Cited
UNITED STATES PATENTS
| | | | |
|---|---|---|---|
| 1,358,557 | 11/1920 | Jones | 105/61 |
| 2,617,546 | 11/1952 | Rosener | 214/44 |
| 3,078,392 | 2/1963 | Bollesen | 318/447 |
| 3,349,718 | 10/1967 | Bradt et al. | 104/172 BT |
| 3,416,625 | 12/1968 | Narutani | 180/96 |
| 3,644,811 | 2/1972 | Robbins | 318/447 |
| 3,493,835 | 2/1970 | Hellmann | 318/447 |

FOREIGN PATENTS OR APPLICATIONS
| | | | |
|---|---|---|---|
| 248,791 | 9/1911 | Germany | 104/148 R |

Primary Examiner—Trygve M. Blix
Assistant Examiner—Galen L. Barefoot
Attorney, Agent, or Firm—Werner W. Kleeman

[57] ABSTRACT

A conveyor installation embodying individual rail-bound self-propelling vehicles or vehicle groups, wherein each vehicle is equipped with a drive motor supplied with power via current rails. The vehicles or vehicle groups possess at both ends a respective contact element essentially located at the same height and at least the contact element which is rearwardly located with regard to the direction of travel has current supplied thereto. The front contact element is coupled with a switching element located at the drive current circuit of the drive motor and interrupts the drive current of the drive motor at least for such length of time as, viewed in the direction of travel, the front contact element touches the rear contact element of a similar type vehicle or vehicle group located forwardly in the direction of travel.

11 Claims, 3 Drawing Figures ized and 2 CONVEYOR INSTALLATION WITH INDIVIDUAL RAIL-BOUND SELF-PROPELLING VEHICLES OR VEHICLE GROUPS

BACKGROUND OF THE INVENTION

The present invention relates to a new and improved conveyor installation having individual rail-bound self-propelling vehicles or vehicle groups, each is equipped with a drive motor furnished with power via current rails and the vehicles or vehicle groups are provided at both ends with a respective contact element located at the same height, and wherein at least the contact element which is at the rear with regard to the direction of travel is furnished with current.

A conveyor installation of the above-mentioned general type is known from German Patent No. 248,791. The contact elements are constructed as feelers, wherein each rearward disposed contact element is provided with a switch, one pole of which is connected with the associated front contact element. The other pole of the switch is alternately connected from vehicle to vehicle with the one or the other current rail. The vehicles form in alternating sequence electrical contacts which produce a short circuit-current interruption when more than two vehicles travel towards one another and thus bring to standstill the entire further travelling operation so as to insure against overloading of the path of travel or track.

This type equipment of such conveyor installation serving as a purely overload safety device only functions as an emergency device when more than two vehicles approach one another. When only two vehicles approach one another, stopping of the installation does not occur, rather the trailing vehicle pushes the leading vehicle ahead of it as long as it is not blocked. Only upon the arrival of a third and further vehicles are both current rails short-circuited via the contact elements of the vehicles and there is triggered an overload security operation at the current supply to the vehicles which then shuts down the entire conveyor installation. Only after manually rectifying the bunching together or clustering of the vehicles and switching-in the overload safety device is it possible to again place the conveyor installation into its preparatory operable state. In the event such type conveyor installation is to be operated with a close spacing of the vehicles, then, in order to prevent frequent repeated interruptions in operation owing to the closely travelling vehicles, the system must be provided with block or blocking sections or stations.

In the case of conveyor installations having individual rail-bound self-propelling vehicles or vehicle groups it is known to maintain an orderly travelling operation in that the path sections are divided into blocking sections. A vehicle or vehicle group can only then travel into a blocking section when no vehicle is located at this blocking section. The subdivision of a path section into blocking sections however requires a quite considerable circuit expenditure and therefore not only increases the expense of the conveyor installation, but also considerably impairs the traffic frequency i.e. the throughput of the vehicles per unit of time.

With a further known conveyor installation having rail-bound self-propelling vehicles, there are provided blocking sections essentially only at branch locations and the vehicle traffic is permitted to travel in an unregulated fashion at the remaining path sections, so that under circumstances the vehicles can catch-up with and bump one another. While the expenditure in circuit design for this known conveyor installation is indeed reduced, still for the purpose of forming stations there always must be provided branch path sections. Moreover, the travelling behavior of vehicle units which push one another, particularly at curves, is impaired.

SUMMARY OF THE INVENTION

Hence, from what has been discussed above, it will be seen that this particular field of technology is still in need of conveyor installations of the aforementioned type which are not associated with the drawbacks and limitations of the prior art proposals. Therefore, it is a primary object of the present invention to provide a new and improved construction of such type conveyor installation which is capable of effectively and reliably fulfilling the existing need in the art and is not associated with the aforementioned drawbacks and limitations of the prior art constructions.

Another and more specific object of the present invention is directed to a conveyor installation of the previously mentioned type which is designed in such a manner that for the purpose of preventing the use of blocking sections or stations the vehicles or vehicle groups upon contacting another vehicle or vehicle group are at least brought to standstill for the duration of contact with the other vehicle or vehicle group.

Still a further significant object of the present invention relates to a new and improved construction of conveyor installation for individual rail-bound self-propelling vehicles or vehicle groups which is extremely reliable in operation, economical to manufacture, not readily subject to breakdown, and requires a minimum of servicing and maintenance.

Now in order to implement these and still further objects of the invention, which will become more readily apparent as the description proceeds, it is contemplated that the front contact element is connected with a switching element at the drive current circuit of the drive motor and the drive current of the drive motor is at least interrupted for such length of time as, viewed in the direction of travel, the front contact element contacts the rear contact element of a similar vehicle or vehicle group arranged forwardly in the direction of travel.

The novel conveyor installation of this development affords a whole series of decisive advantages: in the first instance, the vehicles or vehicle groups can travel in a dense or tight column without requiring the use of blocking sections or other complicated devices for regulating the spacing between the vehicles or vehicle groups, since upon contact of the vehicles or vehicle groups with one another the rearward vehicle or vehicle group stops until the preceding vehicle or vehicle group has moved away. An interruption of the conveyor installation does not occur.

Furthermore, it is possible to simplify, for instance, the design or construction of holding stations or locations in that it is possible to dispense with branch locations and to only then interrupt the delivery of current to a holding station when a vehicle or vehicle group should stop. All following vehicles or vehicle groups can then travel against the stopped vehicle and are automatically stopped. For further propelling the vehicle unit, it is only necessary to again furnish current to the current rails at the holding station so that the first vehicle can drive away. All following vehicles will then thereafter likewise drive on.

Owing to the novel construction of conveyor installation there is also prevented so to speak squeezing or compression of the vehicles since such, when contacting another vehicle, will always be brought to standstill. Thus, at the moment of contact the thrust or pushing force of the trailing vehicle will be interrupted. In face, this can even lead to a certain regulation in the spacing.

It is particularly advantageous if the vehicles or vehicle groups contain a timing or timer which briefly suppresses starting-up of a vehicle or vehicle group which has been stopped after having driven against a preceding vehicle or vehicle group, even if the preceding vehicle or vehicle group has already driven off. This construction allows for an automatic regulation of the spacing of vehicles or vehicle groups which travel in a tight or closely spaced column. Furthermore, this construction brings with it the advantage that vehicles can be removed at a holding station from the path of travel without the trailing vehicle immediately moving up.

According to an advantageous construction, the vehicles or vehicle groups equipped with containers and closure caps for sealing such containers are designed in such a manner that the contact elements are bridged by conductors in which there are arranged switches coupled with the closure caps which are closed when the closure caps are not closed. In this way, there can be prevented the starting up and travelling of a vehicle or vehicle group if the closure caps are not closed.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
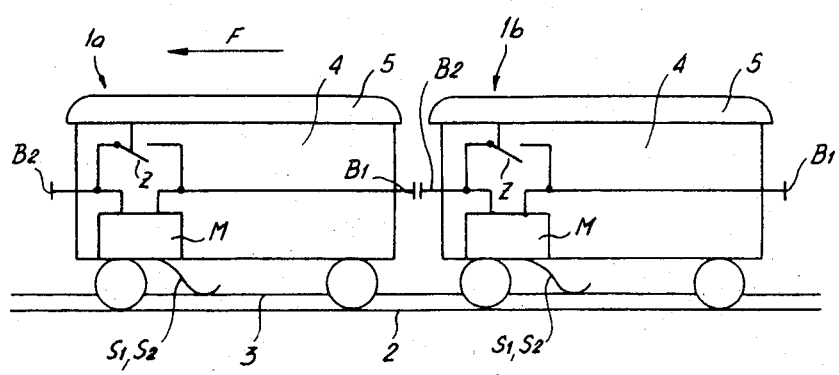
FIG. 1 is a side view of a portion of the inventive conveyor installation depicting two vehicles in a condition where they have travelled to a point where they contact one another.

Describing now the drawings, in FIG. 1 there is illustrated two vehicles or carriages 1a and 1b which travel upon rails 2 in the direction of travel generally indicated by reference character F. The vehicles 1a and 1b each contain an electric drive motor M which receives its drive current via sliding contacts S1 and S2 from current rails 3. At the front end and at the rear end of each vehicle there are arranged at essentially the same height contact elements or surfaces B2 and B1 of a vehicle stopping mechanism. Instead of the individual vehicles it would also be possible to have vehicle groups consisting of a number of such individual vehicles equipped with the stopping mechanism, wherein at the front and the rear end of each such vehicle group there would be provided a respective contact element or surfaces B2 and B1. Hence, conceptually the units 1a and 1b may be considered to constitute individual vehicles or respective groups of such vehicles. The contact elements B2 and B1 are preferably constructed and arranged in such a manner that there is possible faultless contact of the contact elements of the vehicles or vehicle groups which have abutted against one another for every encountered travelling situation. This is especially so for markedly curved horizontal or vertically extending curves as well as for branches or branch locations. If desired, it is advantageous to construct a portion of the front and the rear end of the vehicle as a metallic surface at which the vehicles can roll-off from one another when travelling in curves. Additionally, it is to be understood that the vehicles 1a and 1b are each equipped with a container or receptacle 4 which can be closed by means of a suitable closure cap or cover member.

Figure 2:
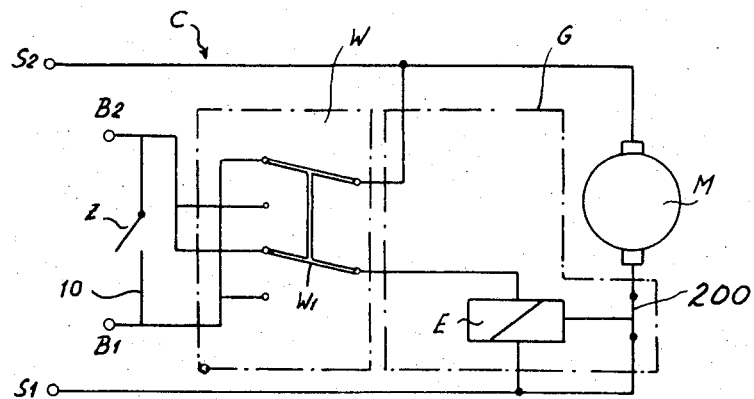
FIG. 2 is a schematic circuit diagram of a device for stopping the vehicles when they have contacted one another.

FIG. 2 illustrates a circuit diagram of a particularly simple device for stopping the drive of a vehicle when such vehicle travels against another vehicle. This circuit diagram shows the manner in which the drive motor M can be furnished with current via the sliding contacts S1 and S2. The stopping device or mechanism contains the front contact element $B_2$ and the rear contact element or surface $B_1$ which are coupled via a switching or reversing mechanism W and a switching element or surface or circuit G with the drive current circuit C of the drive motor M. The switching mechanism W consists of a switch $W_1$ which upon changing the direction of travel is mechanically or electrically switched-over and connects the rear contact element B1 or B2 with the current source, that is in the present case with the sliding contact S2. The momentarily forwardly arranged contact element B2 is connected via the switch $W_1$ with the relay E defining an actuation member which in its rest state provides the current supply via the associated contact 20 to the drive motor M. If the front contact element B2 is connected with the rear contact element B1 of a preceding vehicle, then the relay E is energized and interrupts the current supply to the drive motor M.

The circuit diagram of FIG. 2 contains a conductor 10 which bridges the contact elements B1 and B2, and at which there is arranged a further switch Z which is coupled with the associated closure cap 5. This switch Z is open when the associated closure cap or closure member 5 is closed and provides a shunt or bridge for the contact elements B1 and B2 as soon as the closure cap member is open. As a result, there is triggered the same function as if a vehicle had travelled against another vehicle, that is to say, the vehicle is stopped for such length of time until the closure cap is closed.

Figure 3:
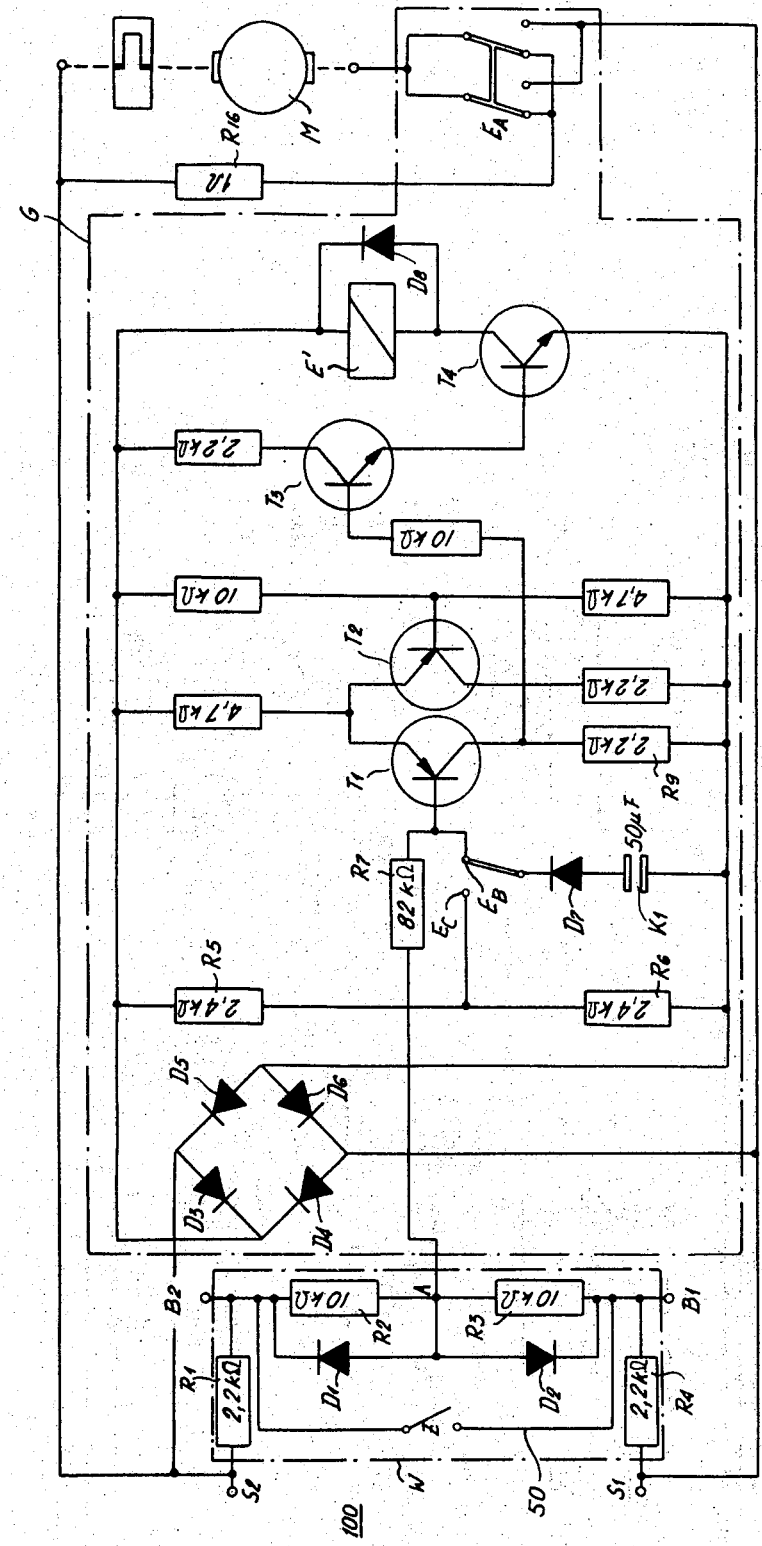
FIG. 3 is a circuit diagram of a further embodiment of device for stopping the vehicles upon travelling against other vehicles.

FIG. 3 depicts a circuit diagram of a further embodiment of device for stopping a vehicle upon impacting against a preceding vehicle. This type of stopping device is intended to be employed in conjunction with vehicles operated by a direct-current power supply, generally schematically indicated at 100, in which the change in the direction of travel is realized by reversing or switching the supply of current.

With this embodiment the drive motor M is likewise supplied with current via the sliding contacts S1 and S2 from the power supply-current rails 3 for the travelling rails 2.

The stopping device contains the contact elements or surfaces B1 and B2, both of which are furnished with current, wherein however the rear contact element B1 is at a greater potential than the front or forward contact element B2. This is realized by means of a switching mechanism W consisting of a resistance matrix R1, R2, R3 and R4. As a result, each contact element B1 and B2 is connected through the agency of a respective resistor R4 and R1 with one of the sliding contacts S1 and S2. Both contact elements B1 and B2 are connected with one another through further resistors R3 and R2, wherein there is connected in parallel with each such resistor a respective diode D2 and D1 as clearly shown in FIG. 3. However, these diodes are poled in opposite direction so that depending upon the direction of vehicular travel the one or the other resistor R3 or R2 is short-circuited. Owing to this resistance matrix there is realized that always the rear contact element B1 has a greater positive potential than the front or forward contact element B2. The contact elements B1 and B2 are here also further bridged by a conductor 50 in which there is arranged a switch Z which is coupled with the associated closure cap 5, and which switch Z is open when the closure cap 5 is closed.

Now, between both resistors R3 and R2 which connect the contact elements B1 and B2, there is connected at the terminal or junction A a switching element or circuit G which interrupts the drive current as soon as the voltage at such terminal or junction point A exceeds a threshold value of the switching element upon contact of the front contact element B2 with the rear contact element B1 of a preceding vehicle or upon the closing of the switch Z. The switching element or circuit G is provided for this purpose with a differential amplifier embodying the transistors T1 and T2. When the vehicle is freely travelling, that is to say, without contacting a preceding vehicle, the voltage at the terminal A is smaller than the threshold value and the transistor T1 is not conductive. Upon contact of the front contact element B2 with the rear contact element B1 of a preceding vehicle or upon closing switch Z, the transistor T1 is rendered conductive and the successively arranged Darlington circuit containing the transistors T3 and T4 is controlled. As a result, the relay E' which is arranged at the Darlington circuit is de-energized and the drive current of the drive motor is interrupted. In the example under consideration, the relay E' is equipped with an additional contact $E_A$ which short circuits and thus brakes the motor M via the resistor R16.

The relay E' contains a further rest contact $E_B$ which actuates a timing element embodying the capacitor K1. By means of the rest contact $E_B$ the capacitor K1 is discharged across the resistor R7, the base-collector path of the transistor T1 and the resistor R9, so that a delay time of for instance 2.5 sec. is realized. The capacitor K1 is charged during the travelling operation by means of the work contact $E_C$ of the relay E' through the agency of the resistor R5.

In order that the switching element or circuit G during a change in the direction of current of the current rails always contains current of the same polarity, there is provided a bridge circuit consisting of the diodes D3, D4, D5, D6.

A diode D7 provided at the timing element insures that, upon switching-in of the travelling current and if a number of vehicles travel against one another, the voltage at the base of the transistor T1 will not drop beneath the threshold value, since at the moment of switching-in the capacitor can be considered to be short-circuited.

The diode D8 connected parallel to the relay E' serves as an extinguishing diode in order to short-circuit the cut-off peaks of the relay.

The illustrated exemplary embodiment of device for stopping a vehicle upon arrival at another vehicle is, for instance, designed for a travelling current of 10 to 30 volts direct-current. The contact or shock voltage at the contact elements is however lower, likewise the current intensity which is available at that location.

The illustrated embodiment insures that a vehicle which travels against the rear of another vehicle, even after driving away of the preceding vehicle, will remain stationary for a short period of time of for instance 2.5 seconds. If a number of vehicles impact against one another, then all of them will be stopped under the action of the electrical braking. The device is also then functionally reliable if a vehicle travels onto a path section at which both current rails for the purpose of exerting the braking action and stopping a vehicle are supplied with a positive voltage. Also in that case successive vehicles will be stopped. The stopping devices illustrated in connection with the illustrated exemplary embodiments are functional both during forward as well as rearward travel of the vehicles. They are exceptionally robust and also completely effective even when there arises voltage fluctuations and current interruption. Moreover, the stopping device of FIG. 3 is particularly manifested by the features that the current applied to the contact elements is a low amperage current of lesser voltage and current intensity than the travelling current. As a result, the contact voltage is smaller in the case of unintentional touching of the vehicles. Additionally, voltage spikes brought about by the switching operations at the drive current circuit are held away from the contact elements and the stopping device. This results, in particular, in a longer functional reliability of the contact elements. Moreover, this stopping device is not very sensitive to jarring and therefore operationally reliable.

Finally, by way of completeness, it is here to be mentioned that the term "vehicle unit" or equivalent expression as used hereinafter, is intended to denote an individual vehicle as well as a vehicle group consisting of a number of such individual vehicles.

While there is shown and described present preferred embodiments of the invention, it is to be distinctly understood that the invention is not limited thereto but may be otherwise variously embodied and practiced within the scope of the following claims.

Accordingly, what is claimed is:

1. A conveyor installation comprising individual rail-bound, self-propelling vehicle units, such as vehicles or groups of vehicles, each vehicle unit having an electrical drive motor, a drive current circuit including current supply means, each vehicle unit being provided at both ends with a respective electrical contact surface means located at substantially the same height, each vehicle unit being equipped with a switching element including an actuation member and a contact, said switching element being coupled in circuit by means of its contact with the drive current circuit of the drive motor, wherein upon travel of said vehicle unit against another vehicle unit and contact of the respective contact surface means with one another said switching element is actuated and the drive current circuit of the drive motor is interrupted at least for the duration of contact of the vehicle units with one another, said electrical contact surface means defining a rear contact surface and a front contact surface for each vehicle unit, the rear contact surface being electrically connected with one pole of the current supply means and the front contact element being electrically connected via said actuation member of the switching element with another pole of the current supply means.

2. The conveyor installation as defined in claim 1, wherein each vehicle unit embodies means such that it can drive forwardly and rearwardly and possess a switching mechanism which switches the contact surface means in accordance with the direction of travel.

3. A conveyor installation comprising individual railbound self-propelling vehicle units, such as vehicles or groups of vehicles, each vehicle having a drive motor, a drive current circuit including current rail means for supplying current to said drive motor, each vehicle or vehicle group being provided at both ends with a respective contact element located at substantially the same height, at least the contact element at the rear of the vehicle or vehicle group viewed in the direction of travel being furnished with current, switching circuit means arranged at said drive current circuit of the drive motor with which the front contact element is connected, and said switching circuit means interrupting the drive current of the drive motor of a trailing vehicle or vehicle group at least for such length of time as, viewed in the direction of travel of the vehicles or vehicle groups, the front contact element of said trailing vehicle or vehicle group contacts against the rear contact element of a vehicle or vehicle group located forwardly in the direction of travel, said vehicles or groups of vehicles embodying means such that they can drive forwardly and rearwardly and possess a switching mechanism which switches the contact elements in accordance with the direction of travel, and wherein the switching mechanism is controlled as a function of the direction of travel and connects the front contact element with the switching circuit means and the rear contact element with the current rail means.

4. The conveyor installation as defined in claim 3, wherein the switching circuit means incorporates relay means.

5. A conveyor installation comprising individual railbound self-propelling vehicle units, such as vehicles or groups of vehicles, each vehicle having a drive motor, a drive current circuit including current rail means for supplying current to said drive motor, each vehicle or vehicle group being provided at both ends with a respective contact element located at substantially the same height, at least the contact element at the rear of the vehicle or vehicle group viewed in the direction of travel being furnished with current, switching circuit means arranged at said drive current circuit of the drive motor with which the front contact element is connected, and said switching circuit means interrupting the drive current of the drive motor of a trailing vehicle or vehicle group at least for such length of time as, viewed in the direction of travel of the vehicles or vehicle groups, the front contact element of said trailing vehicle or vehicle group contacts against the rear contact element of a vehicle or vehicle group located forwardly in the direction of travel, said drive current circuit embodying directcurrent source means at which there is connected the current rail means and a potential is applied to both contact elements, wherein the rear contact element has the greater potential applied thereto, a pair of series connected resistors bridged by respective oppositely poled diodes for interconnecting both contact elements with one another, said switching circuit means being connected between said resistors and interrupting the drive current as soon as contact of the forward contact element with the rear contact element of a preceding vehicle or vehicle group causes the voltage at the switching circuit means to exceed a threshold value.

6. The conveyor installation as defined in claim 5, wherein the switching circuit means comprises a differential amplifier and a successively arranged Darlington circuit having a relay for interrupting the drive current circuit.

7. The conveyor installation as defined in claim 6, wherein said switching circuit means further includes a diode bridge circuit provided for the current infeed for the switching circuit means.

8. The conveyor installation as defined in claim 7, said switching circuit means further including a timing element which delays switching-in of the drive motor of a trailing vehicle or vehicle group directly following completion of contact of the front contact element thereof with a rear contact element of the forwardly located vehicle or vehicle group.

9. The conveyor installation as defined in claim 1, wherein the contact surface means have applied thereto 10 – 30 volts direct-current.

10. The conveyor installation as defined in claim 1, wherein said contact elements surface means insure that for each encountered traveling situation the contact surface means of vehicle units which have impacted against one another contact one another.

11. The conveyor installation as defined in claim 1, including a respective container having a closure cap provided for each vehicle unit a conductor for bridging said contact surface means, a switch coupled with an associated closure cap which is closed when such closure cap is not closed, said switch being arranged in circuit with said conductor.

* * * * *